3,324,097
POLYMERISING VINYL CHLORIDE

Gordon Edmund Alfred Pears, St. Albans, England, assignor to Imperial Chemical Industries Limited, London, England, a corporation of Great Britain
No Drawing. Filed Dec. 2, 1963, Ser. No. 327,510
Claims priority, application Great Britain, Mar. 29, 1963, 12,617/63, 12,618/63; May 10, 1963, 18,621/63
32 Claims. (Cl. 260—92.8)

The present invention relates to the polymerisation of vinyl chloride and more particularly to its polymerisation in the presence of monomer-soluble catalysts.

It is known that by choosing vinyl chloride polymers in the form of small particles (that is, about 0.1–2 microns) relatively stable dispersions of the polymers in plasticisers may be formed which are gellable on heating to give protective coatings or self-supporting articles. The stability of these dispersions, or pastes as they are usually called, depends largely upon the average polymer particle size and the size range of the particles: for example, if the average polymer particle size is too great, sedimentation will tend to occur when the paste is left to stand. Upon the same variables also depend the viscosity characteristics of the pastes such as their initial viscosity upon formation and their rate of change of viscosity with time on standing. For example, where the paste contains a large number of particles of less than 0.1 micron in size, its viscosity may increase at an undesirably rapid rate on standing.

To obtain certain desirable properties in the paste, such as a low initial viscosity and only a slow increase in viscosity on ageing it is generally necessary to use a mixture of at least two different particle sizes covering the whole or part of the range 0.1–2 microns. The manufacture of such a mixture can be difficult to achieve using conventional emulsion polymerisation techniques unless two or more separately prepared latices of the required different particle sizes are blended together. Careful control of both the polymerisation and the blending is required in order to achieve a consistent product.

It has been found that by homogenising a dispersion of the monomer in water in the presence of a surfactant, and then polymerising the homogenised dispersion, the resultant polymer may be obtained in the form of the particles within the size range of about 0.1–2 microns. This effect is reproducible, and the process which is easy to operate may be used therefore to give consistent products. Homogenisation of the monomer dispersion may be effected by the application of a shear force to it. A large number of suitable forms of apparatus may be used for this purpose such as, for example, colloid mills, high speed pumps, vibratory stirrers, ultrasonic devices and high speed stirrers which cause the dispersion to impinge upon flat baffles by the action of centrifugal force. Suitable control of the homogenisation step will control the particle size of the polymeric product.

Pastes developed from polymers formed by the polymerisation of such an homogenised dispersion have generally improved viscosity characteristics shown in low initial viscosity, lower rates of ageing and improved consistency of the paste.

The catalyst generally preferred for the polymerisation of homogenised dispersions is a long chain diacyl peroxide, generally lauroyl peroxide but with normal amounts of this catalyst the polymerisation tends to be undesirably slow at temperatures at which polymer having the required properties can be made. If a greater amount of catalyst is used in an effort to reduce the reaction time, the polymeric product is found to suffer from poor heat stability. The use of peroxydicarbonates, which are more active catalysts by themselves, tends to increase the number of particles in the polymeric product having a size of less than 0.1 micron to an undesirable extent and also causes heavy accumulation of undispersed polymer, known as "build-up," in the polymerisation vessel. The clearance of the build-up reduces the availability of the reaction vessels for polymerisation and is in itself also a costly process.

It is an object of the present invention to provide a peroxydicarbonate catalysed process in which vinyl chloride is polymerised as an homogenised dispersion in water and in which wet polymer build-up in the reaction vessel is reduced below that normally obtained using the peroxydicarbonate as catalyst and preferably to an amount which is of the order of that normally encountered in an homogenisation process based on lauroyl peroxide as catalyst.

According to the present invention we provide a process comprising dispersing vinyl chloride and from 0 to 20% of its weight of at least one other mono-ethylenically unsaturated copolymerisable monomer in water together with a surfactant and at least 0.005% by weight of the polymerisable monomer of a catalyst comprising one or more organic peroxydicarbonates in which the organic groups attached to each carbonate group each contain at least 5 carbon atoms, homogenising the resulting dispersion and polymerising the homogenised dispersion at an elevated temperature in the presence of at least 0.05%, based on the weight of polymerisable monomer of long-chain material comprising at least one compound selected from the group consisting of (a) compounds having the structure ROR', where R is a monovalent hydrocarbon radical containing an aliphatic chain of at least 8 carbon atmos directly linked to the oxygen atom and R' is hydrogen or a monovalent hydrocarbon radical; (b) hydrocarbons and halogenated hydrocarbons having an aliphatic group containing a chain of at least 8 carbon atoms; (c) carbonyl compounds having the structure ZA.CO.BZ' where Z is hydrogen, an alkyl group or a substituted alkyl group, Z' is an alkyl group or substituted alkyl group, A and B are each direct linkages or oxygen atoms and B is an oxygen atom when A is an oxygen atom and the sum of oxygen atoms and aliphatic carbon atoms in a single chain in the compound is at least 12, and (d) compounds having the structure

M.O.CO.L.CO.O.N where M and N are each monovalent hydrocarbon radicals which may be the same or different and L is a direct link or a divalent organic radical and in which the sum of atoms in L in a chain between the ester groups which it links plus the sum of carbon atoms in M in the longest straight chain connected to the carboxyl oxygen atom plus the sum of the carbon atoms in N in the longest straight chain connected to the carboxyl oxygen atom is at least 20.

It will be appreciated that not only may mixtures of compounds within one of our specified classes be used in the process of the invention but mixtures of one or more compounds in any one of our specified classes may be used in combination with a member or members of one or more of the other classes if desired.

Monomers which may be copolymerised with vinyl chloride include, for example, alkenes (e.g. ethylene, propylene, n-butene or isobutene), vinyl acetate, acrylonitrile, vinylidene chloride, acrylic and methacrylic acids and their esters and nitriles, vinyl ethers and maleic and fumaric acids, their esters and anhydride.

Our specified peroxydicarbonates may be represented by the structure XO.CO.OO.CO.OY in which X and Y are organic moieties each containing at least 5 carbon atoms; the common peroxydicarbonates are those in which X and Y are monovalent hydrocarbon or substituted hydrocarbon groups which may be the same or different. Our preferred peroxydicarbonates are the alkyl (including cycloalkyl) derivatives, particularly those in which X and Y each contain from 5 to 20 carbon atoms and particularly those in which X and Y are the same. We further prefer to use those peroxydicarbonates in which X and Y are each alkyl groups containing a straight chain of at least 4 carbon atoms connected to the carbonate group. Examples are di-n-amyl, di-isoamyl, dihexyl, dioctyl, di-2-ethylhexyl, dinonyl, dilauryl and distearyl peroxydicarbonates. Peroxydicarbonates having fewer than 5 carbon atoms in the organic moieties tend to promote undesirable amounts of build-up in spite of the presence of the carbonyl compound. We have found that dialkyl peroxydicarbonates having from 6 to 13, and preferably from 8 to 10, carbon atoms in each alkyl group are very useful in the process of the invention. Mixtures of two or more peroxydicarbonates, such as peroxydicarbonates prepared from mixtures of alcohols, having 7 to 9 carbon atoms, may be used in the process of the invention if desired.

The amount of peroxydicarbonate or mixture of peroxydicarbonates used is generally of the order of 0.01 to 0.10% by weight of the polymerisable monomers although amounts as small as 0.005% and amounts of up to 0.5% or higher may be used if desired. Below 0.005% the polymerisation becomes very slow while the use of amounts over about 0.5% by weight is generally precluded for economic reasons.

Long chain compounds falling within group (a) that may be used to reduce build-up are alcohols having the structure ROH where R is an aliphatic or araliphatic radical containing at least eight carbon atoms in the aliphatic chain and ethers derived from these alcohols by replacing the hydrogen atom by a monovalent hydrocarbon radical. They may be used singly or in combination.

In general, increase in the aliphatic carbon chain length of these compounds increases their effectiveness in reducing build-up and vice-versa. The use of a compound in which R has an aliphatic chain of less than 8 carbon atoms generally does not reduce build-up to a useful extent. On the other hand, with increase in chain length, the compound normally becomes increasingly difficult to disperse effectively in the polymerisation medium. As a general rule, the lower members of this class, and of classes (b), (c) and (d), are liquids readily miscible with vinyl chloride while the higher members are solids which may be dissolved in the vinyl chloride or readily dispersed in the polymerisation medium. With further increase in molecular weight solid compounds are obtained, e.g. microcrystalline waxes in the case of class (b), which are neither soluble to any significant extent in vinyl chloride nor readily dispersible in the polymerisation medium.

We prefer to use those compounds in this class and in our classes (b), (c) and (d) which are liquids miscible with vinyl chloride or solids which are soluble in vinyl chloride or readily dispersible in the polymerisation medium.

We prefer that our compounds of classes (a), (b), (c) and (d) have little or no chain-branching since chain-branched compounds are generally less effective in reducing build-up. We further prefer that the compounds are substantially free from unsaturation since the presence of unsaturated groups in the compounds may encourage their copolymerisation with the monomers and retard the polymerisation and may adversely affect the physical properties of the polymeric product.

Examples of compounds of class (a) that may be used are n-octyl alcohol, nonyl alcohol, decyl alcohol, undecyl alcohol, lauryl alcohol, tridecyl alcohol, myristyl alcohol, cetyl alcohol and stearyl alcohol, aryl-substituted (e.g. phenyl-substituted) derivatives of these alcohols and ethers derived from these alcohols or their aryl-substituted derivatives by the substitution of the hydrogen atom on the hydroxyl group by a monovalent hydrocarbon radical.

We prefer to use alcohols of the structure ROH where R is an unsubstituted aliphatic hydrocarbon radical because of their ready availability and reasonable cost. Of these, we prefer to use those having from 12 to 18 carbon atoms because they combine effectiveness in reducing build-up with ready miscibility with, or solubility in, vinyl chloride. Our preferred compounds are lauryl, myristyl, cetyl and stearyl alcohols or mixtures of such alcohols.

These compounds are used in amounts of at least 0.05% by weight of polymerisable monomer; less than this amount generally has insufficient effect in decreasing build-up. We prefer to use amounts of from 0.2 to 4% by weight. Increasing the amount above 4% generally results in little or no further increase in effect on build-up and may have a deleterious effect on the physical properties of the polymer.

Hydrocarbons and chlorinated hydrocarbons (b) that may be used in our process in order to reduce build-up are aliphatic hydrocarbons having a chain of at least 8 carbon atoms, aryl substituted derivatives of these hydrocarbons and the products of halogenating the hydrocarbons or their aryl-substituted derivatives. They may be used singly or in combination.

In general, increase in the aliphatic carbon content of these compounds increases their effectiveness in reducing build-up and vice-versa. The use of a compound having a chain of less than eight aliphatic carbon atoms generally does not reduce build-up to a useful extent. On the other hand, with increase in chain lengths, the compound normally becomes increasingly difficult to disperse in the polymerisation medium.

Examples of our preferred compounds of class (b) are nonane, decane, undecane, dodecane, tridecane, tetradecane, hexadecane, octadecane, eicosane, heneicosane, docosane, triacontane, nonyl benzene, decyl benzene, dodecyl benzene and their halogenated derivatives. Of the halogenated derivatives, we prefer the chlorinated compounds because of their ease of manufacture and ready availability.

We prefer to use alkanes or alkyl benzenes having at least 12 carbon atoms in the aliphatic chain because these are particularly effective in reducing build-up and we further prefer to use alkanes containing from 15 to 22 carbon atoms or mixtures of such alkanes since they are effective in reducing build-up, are easily handled, and may act as lubricants for the resulting polymer.

The chlorinated hydrocarbons may be readily prepared containing up to 70% by weight of chlorine and such compounds are also suitable for use in our compositions.

Our specified hydrocarbons or halogenated hydrocarbons are used in amounts of at least 0.05% by weight of polymerisable monomer; less than this amount generally has insufficient effect in decreasing build-up. We prefer to use amounts of from 0.1 to 4% by weight. Increasing the amount above 4% generally results in little or no further increase in effect on build-up and may have a deleterious effect on the physical properties of the polymer.

Carbonyl compounds of group (c) that may be used in our invention are aldehydes and ketones of the structure ZCO.Z', esters of the structure ZCO.O.Z' and carbonates of the structure ZO.CO.OZ'. In all these groups, the compounds must contain a chain of at least 12 aliphatic carbon (or oxygen and aliphatic carbon) atoms. They may be used singly or in combination.

In general, increase in the chain length of these compounds increases their effectiveness in reducing build-up and vice-versa. The use of a compound having a chain of less than 12 atoms generally does not reduce build-up to a useful extent. On the other hand, as with compounds of groups (a) and (b), with increase in chain length the compound normally becomes increasingly difficult to disperse in the polymerisation medium.

Examples of our compounds of class (c) are methyl decyl ketone, methyl heptadecyl ketone, formic acid esters of normal alcohols containing at least ten carbon atoms, acetic acid esters of normal alcohols containing at least nine carbon atoms, propanoic acid esters of normal alcohols containing at least eight carbon atoms, butyric acid esters of normal alcohols containing at least seven carbon atoms and so on and dihydrocarbonyl carbonates of straight chain alcohols containing at least five carbon atoms. We prefer the alkyl esters of carboxylic acids because of their ready availability.

Our preferred compounds contain a chain of at least 16 carbon atoms (or carbon and oxygen atoms) and preferably from 16 to 24 such atoms. Examples are methyl palmitate, ethyl palmitate and higher molecular weight palmitates, n-propyl laurate, butyl laurate, amyl laurate, 2-ethyl hexyl laurate, undecyl laurate, cetyl formate, stearyl formate, di-n-heptyl carbonate and methyl heptadecyl ketone.

Our specified carbonyl compounds are used in amounts of at least 0.05% by weight of polymerisable monomer since less than this amount generally has insufficient effect in decreasing build-up. We prefer to use amounts of from 0.1 to 4% by weight. Increasing the amount above 4% generally results in little or no further increase in effect on build-up and may have even a deleterious effect on the physical properties of the polymer.

Compounds of class (d) that may be used include esters, particularly alkyl esters, of dicarboxylic acids such as maleic acid, fumaric acid, oxalic acid, malonic acid, succinic acid, glutaric acid, adipic acid, pimelic acid, suberic acid, azelaic acid, sebacic acid and phthalic acid. Specific examples are dialkyl maleates and dialkyl phthalates each derived from alcohols containing at least 7 carbon atoms in a chain connected to the hydroxyl group, for instance di-n-octyl maleate, di-n-octyl phthalate, di-isodecyl phthalate and octyl decyl phthalate. These compounds are used in amounts of at least 0.05% by weight of polymerisable monomer since less than this amount generally has insufficient effect in decreasing build-up. We prefer to use amounts of from 0.1 to 4% weight. Increasing the amount above 4% generally results in little or no further increase in effect on build-up and may have a deleterious effect on the physical properties of the polymer.

Our specified long-chain compounds may be added to the polymerisation medium after homogenisation, if desired. However, the efficiency of the compounds in reducing build-up is to some extent dependent upon the thoroughness with wihch they are dispersed through the medium and therefore where the addition is made after homogenisation, the compounds should be dispersed as uniformly as possible. It is generally preferred to add the compounds before homogenisation since in this way, effective dispersion is assured in most cases. In some instances, for example in the case where the long-chain compound is a solid not readily soluble in the vinyl chloride at the temperature of homogenisation, it may be useful to pre-disperse it in a suitable liquid before homogenising it in admixture with the other ingredients for the polymerisation. Our long-chain compounds may be added alone, in solution or as a dispersion in a suitable medium.

Any emulsifying agent or dispersing agent may be used as the surfactant in our invention. Emulsifying agents may be anionic, cationic or non-ionic. Examples of anionic agents are the sodium salts of sulphated and sulphonated hydrocarbons and fatty acids such as dioctyl sodium sulphosuccinate, sulphonated diesel oil and sodium lauryl sulphate. Examples of cationic agents are quaternary ammonium compounds such as stearamidopropyl dimethyl-β-hydroxyethyl ammonium nitrate, cetyl pyridinium chloride and cetyl trimethyl ammonium bromide. Examples of non-ionic agents are block copolymers of propylene oxide and ethylene oxide.

We prefer to use anionic emulsifying agents since they are more efficient in stabilising the resultant polymer latex. Of these, some will be found to be more useful than others, depending on the process conditions, and the most suitable may be found by simple experiment.

Dispersing agents are generally protective colloids such as gelatin, methyl cellulose, high molecular weight polyethylene oxides, gum tragacanth and completely or partially hydrolysed polyvinyl acetates.

Where an emulsifying agent is chosen, amounts of 0.3 to 2% based on the weight of polymerisable monomers are generally suitable although greater or lesser amounts may be used in some circumstances since the efficiencies of individual agents vary. For dispersing agents, contrary to experience in conventional granular polymerisation processes, amounts of up to 4% or even 5% by weight of the monomers may be required for the best results. While the amount of dispersing agent used will depend to some extent upon the choice of agent, less than 1% is generally not satisfactory in this process.

The suspension of monomer in water may be formed by any suitable means such as stirring the monomer, water and surface active agent (i.e. emulsifier or dispersing agent) together in a vessel or metering the ingredients with stirring into the feed line to the homogeniser. The catalyst is also added at this stage in order to disperse it effectively throughout the suspension.

Homogenisation of the suspension of monomer in water may be effected by any suitable process and using any suitable apparatus such as those mentioned hereinbefore. We have found that homogenisation is simply effected and readily controlled by using a high speed pump. A two-stage pump gives very good results. The pressures of each stage are adjusted to give the required particle size in the polymer and suitably may be varied in the range of from 5000 to 500 pounds per square inch. Greater or smaller pressures may be used if desired but we have found that a first stage pressure of about 2000 p.s.i. combined with a second stage pressure of about 500 p.s.i. generally gives consistently good results.

The suspension may be formed in a holding vessel, passed through the homogeniser and thence to the polymerisation vessel or it may be formed in the polymerisation vessel and cycled through the homogeniser and back to the polymerisation vessel before polymerisation. The cycle may be repeated if desired and recycling may be operated continuously.

Since the suspension contains the polymerisation catalyst, the homogenisation is normally effected at a temperature below that at which polymerisation would occur or at which the induction period of the polymerisation is long enough to allow for complete homogenisation prior to the commencement of polymerisation. In general, homogenisation may be effected suitably at about room temperature or a little above, say 10° C. to 30° C.

The polymerisation is generally effected in the absence of any substantial quantities of air or oxygen and may be carried out conveniently either under an atmosphere of inert gas such as nitrogen or under the vapour of the monomers. Polymerisation is normally effected at temperatures of from 40° C. to 65° C. Temperatures below 40° C. and above 65° C. may be used if desired but with most of the peroxydicarbonates described hereinbefore polymerisation may be very slow below 40° C. and above 65° C. the molecular weights of the polymeric products tend to be unsuitably low, for example, for purposes where their strength is to be utilised.

The molecular weight of the products may be controlled to some extent if desired by the addition of chain transfer agents, such as methylene dichloride, chloroform or dichloro-ethane.

On completion of polymerisation, the polymer may be separated from the water by any suitable drying techniques such as tray-drying, drum-drying or spray-drying.

The products are polymers and copolymers of vinyl chloride having good resistance to chemicals and useful heat-stability. The products may be blended with any of the normal additives such as stabilizers, pigments, lubricants, mould-release agents, fillers and plasticisers and may be blended with other polymeric materials if desired. They may be moulded or extruded to give articles of many varied shapes. The homopolymers are particularly useful in the manufacture of pastes which may be used in shaping processes, e.g. involving open casting, rotational casting, compression moulding and injection moulding; in coating processes, e.g. by dipping, spreading or spraying techniques or in the manufacture of foams.

The invention is illustrated by the following examples in which all parts are expressed as parts by weight.

Examples 1, 2, 3, 5, 6 and 7 demonstrate the use of our long-chain compounds of group (a); Examples 8 to 13, 15 to 22 and 24 to 26 demonstrate the use of our long-chain compounds of group (b); Examples 27 to 31 and 34 demonstrate the use of our long-chain compounds of group (c) and Examples 35 and 36 demonstrate the use of our long-chain compounds of group (d).

EXAMPLE 1

162 parts of water, 100 parts of vinyl chloride, 1 part of sodium lauryl sulphate and 0.2 part of lauroyl peroxide were added to a stainless steel vessel from which most of the atmospheric oxygen had been removed by evacuation and purging with nitrogen. The mixture was stirred for fifteen minutes to give a coarse dispersion of the vinyl chloride in water. This mixture was then passed once through a two-stage high-speed pump homogeniser, the pressure of the first stage being 3000 p.s.i. and of the second stage 2000 p.s.i. and the homogenised mixture was passed to a stirred evacuated reaction vessel.

The reaction vessel was heated to 50° C. with stirring and the temperature was maintained constant at 50° C. for the duration of the reaction. After 11 hours the pressure in the reaction vessel began to drop and after 12¾ hours it had fallen from 100 to 75 p.s.i. gauge pressure indicating that a high conversion of monomer to polymer had been achieved (approximately 80%). The remaining pressure was then released.

The product was in the form of a polymer latex having a solids content of 32% and the polymer particles lay essentially in the size range of from 0.05 to 1.1 microns. The wet weight of polymer build-up on the walls and stirrer of the reaction vessel was equivalent to 7.9% of the weight of vinyl chloride initially charged to the mixing vessel.

The procedure described above was repeated using 0.035 part of di-iso-octyl peroxydicarbonate as catalyst in place of the lauroyl peroxide. After the polymerisation had been in progress 6¼ hours the temperature of the reaction vessel became very difficult to control and the remaining unpolymerised vinyl chloride was vented to atmosphere. The product was in the form of a latex having a solids content of 13.3%. The weight of wet build-up was equivalent to 21% of the monomer initially charged. The conversion of monomer to polymer in this polymerisation was poor, being less than 45% and the latex contained a much higher proportion of polymer particles below 0.1 micron in size than when lauroyl peroxide was used as catalyst and was not suitable for use in the manufacture of a paste.

In a third polymerisation the process of the second polymerisation was repeated in the presence of 2 parts of lauryl alcohol which were added to the mixing vessel prior to forming the coarse dispersion of vinyl chloride in water. On subsequently polymerising the homogenised dispersion at 50° C. pressure drop occurred after 10 hours and the pressure had fallen to 75 p.s.i.g. after 11 hours. A 30.8% solids latex was obtained and the wet weight of build-up was equivalent to only 3.5% of the weight of vinyl chloride initially charged. The conversion of monomer to polymer and the latex polymer particle size were substantially the same as when using lauroyl peroxide as catalyst.

The latex produced in this third polymerisation was spray dried and the resulting dry polymer was milled to give particles of which less than 1% by weight were of a size greater than 60μ. 100 parts by weight of the milled polymer were mixed with 66 parts of dioctyl phthalate to yield a paste with an initial viscosity of 59 poises. After storage for 14 days at 23° C. the viscosity of the paste had increased only to 87 poises.

EXAMPLE 2

162 parts of water, 1 part of sodium lauryl sulphate and 2.5 parts of a mixture of cetyl and stearyl alcohols (comprising 45% cetyl alcohol and 55% stearyl alcohol) were charged to a mixing vessel and heated to 65° C. while being stirred vigorously to disperse the alcoholic mixture in the water. The dispersion was then cooled to room temperature and 0.035 part of di-iso-octyl peroxydicarbonate was added followed by 100 parts of vinyl chloride after the removal by purging of most atmospheric oxygen present.

Using the same procedure as described in Example 1, the mixture was homogenised and polymerised at 50° C. The pressure in the reaction vessel started to drop after 10 hours and had fallen to 75 p.s.i. after 11½ hours. The latex obtained had a solids content of 26% and the weight of wet build-up was equivalent to 5% of the weight of monomer initially charged.

EXAMPLE 3

Using the procedure described in Example 1, 162 parts of water, 100 parts of vinyl chloride, 1 part of sodium lauryl sulphate, 0.035 part of di-iso-octyl peroxydicarbonate and 2.5 parts of isodecyl alcohol were homogenised and subsequently polymerised at 50° C. After 9 hours the residual vinyl chloride monomer in the reaction vessel was vented off. The product was in the form of a 24.0% solids latex of polymer particles essentially within the size range of from 0.05–1.3 microns and the wet weight of build-up was equivalent to 13.5% of the monomer initially charged.

EXAMPLE 4

By way of comparison, Example 3 was repeated using 2.5 parts of a mixture consisting essentially of $C_7$ and $C_8$ branched-chain alcohols in place of the isodecyl alcohol. After 6 hours it became difficult to control the temperature of the reaction vessel and the remaining vinyl chloride monomer was vented off. Only a small yield of latex of low solids content (9.6%) was obtained and the major portion of the polymer was present as build-up and fine pebble.

EXAMPLE 5

162 parts of water, 100 parts of vinyl chloride, 1 part of sodium lauryl sulphate and 0.05 part of a mixture of dialkyl ($C_7$–$C_9$) peroxydicarbonates were homogenised and polymerised at 50° C. as described in Example 1. After 8½ hours the pressure in the reaction vessel had fallen to 75 p.s.i. and this residual pressure was released. A high proportion of the product was in the form of build-up and only a small yield of a low solids latex was obtained.

On repeating the polymerisation in the presence of 2.5 parts of a mixture of naturally occurring alcohols which contained 4% n-decanol, 77% lauryl alcohol and 19% myristyl alcohol, the reaction time to venting was 8¾ hours. A latex of 31.4% solids content was obtained and the wet weight of build-up was equivalent to only 2.5% of the vinyl chloride initially charged. The latex particles were essentially in the size range of from 0.05–1.3 microns with only a few below 0.1 micron.

EXAMPLE 6

155 parts of water, 1 part of sodium dodecyl benzene sulphonate and 0.05 part of di-2-ethyl-hexyl peroxydicarbonate were charged to a reaction vessel. After evacuating and purging the vessel with nitrogen, 100 parts of vinyl chloride were charged and the mixture stirred for 5 minutes. At the end of this time the mixture was cycled through a two-stage high-speed pump homogeniser back into the reaction vessel. The pressure at the first stage of the pump was 3000 p.s.i. and at the second stage 500 p.s.i. Recycling through the homogeniser was continued for 10 minutes and at the end of this time essentially all of the monomer had been homogenised.

When homogenisation was completed the reaction vessel was heated to 50° C. and maintained at this temperature for the duration of the polymerisation. The pressure formed in the reaction vessel started to drop after 7 hours and after 8¾ hours had fallen to 75 p.s.i. and the residual pressure was then released. The wet weight of build-up in the reaction vessel was equivalent to 44% by weight of the initial monomer charged.

The polymerisation was repeated in the presence of 1 part of di-n-nonyl ether. Pressure drop occurred after 7 hours and after 9 hours the residual pressure of 75 p.s.i. was released. The product was in the form of a 28% solids latex and the weight of wet build-up was equivalent to only 9.6% of the monomer initially charged. The latex polymer particles were in the size range of from 0.05–1.8 microns, similar to those produced when lauroyl peroxide is used as catalyst.

EXAMPLE 7

155 parts of water, 100 parts of vinyl chloride, 1 part of sodium dodecyl benzene sulphonate and 0.05 part of di-isoamyl peroxydicarbonate were homogenised by cycling through a two-stage high-speed pump for 10 minutes and then polymerised at 50° C. After 7¾ hours the pressure in the reaction vessel had fallen to 75 p.s.i. and the residual pressure was released. The weight of wet build-up in the reaction vessel was equivalent to 69% of the weight of vinyl chloride initially charged and only a very dilute polymer latex was obtained.

In a further polymerisation a dispersion of 1 part of dicetyl ether was first made in a solution of 1 part of sodium dodecyl benzene sulphonate in 10 parts of water by heating the mixture with vigorous stirring to 80° C. and then cooling. This dispersion was added to the reaction vessel along with a further 145 parts of water, 100 parts of vinyl chloride and 0.05 part of di-isoamyl peroxydicarbonate. After stirring for five minutes the mixture was homogenised as described above and polymerised at 50° C. Pressure drop occurred after 6¼ hours and after 8 hours the residual pressure of 75 p.s.i. was released. A 27% solids latex was obtained and the weight of wet build-up was equivalent to only 19% by weight of the monomer initially charged. The latex particle size was essentially 0.05–1.3 microns and the proportion below 0.1 micron was similar to when lauroyl peroxide is used as catalyst.

EXAMPLE 8

155 parts of water, 100 parts of vinyl chloride, 1 part of sulphonated diesel oil and 0.2 part of lauroyl peroxide were added to a stainless steel vessel from which most of the atmospheric oxygen had been removed by evacuation and purging with nitrogen. The mixture was stirred for five minutes to give a coarse dispersion of the vinyl chloride in water. The dispersion was then cycled through a two-stage high-speed pump homogeniser back into the reaction vessel; the pressure of the first stage of the pump being 3000 p.s.i. with the pressure of the second stage being 500 p.s.i. Re-cycling was continued until essentially all of the monomer had been homogenised.

After completion of the homogenisation, the reaction vessel was heated to 50° C. and maintained at this temperature throughout the polymerisation. The pressure formed in the reaction vessel started decreasing after 11 hours and after 12½ hours had fallen to about 75 p.s.i.g., denoting that a high proportion of monomer had been converted to polymer. The residual pressure was released. A latex was obtained having a solids content of 22.8%, comprising particles essentially of from 0.05 to 1.1 microns in size. The wet weight of autoclave build-up was equivalent to 3% by weight of the monomer initially charged to the mixing vessel.

The procedure described above was repeated but 0.035 part of di-isodecyl peroxydicarbonate was used as catalyst in place of the lauroyl peroxide. In this case the reaction time to venting at 75 p.s.i.g. was only 10 hours. The product was in the form of a partially coagulated latex and the proportion of polymer latex particles below 0.1 micron in size was considerably increased. The weight of wet build-up on the autoclave walls was equivalent to 35% by weight of the monomer initially charged to the mixing vessel.

In a third polymerisation using 0.035 part of di-isodecyl peroxydicarbonate as catalyst, 0.5 part of n-heptadecane was added to the reaction vessel before the coarse dispersion was homogenised. The reaction time to venting at 75 p.s.i.g. was only 10 hours again. A 24.7% solids latex of particle size 0.05–1.2 microns was obtained, the proportion of polymer particles below 0.1 micron being of the same order as when lauroyl peroxide was used as catalyst. The wet weight of build-up was reduced to only 3.2% of the weight of monomer initially charged.

EXAMPLE 9

Using the same procedure as described in Example 8 a dispersion of 155 parts of water, 100 parts of vinyl chloride, 1 part of sulphonated diesel oil and 0.05 part of di-iso-octyl peroxydicarbonate was homogenised using a two-stage high-speed pump homogeniser: the pressure at the first and second stages of the pump being 1500 and 500 p.s.i. respectively.

When homogenisation was completed the reaction vessel was heated to 50° C. and maintained at this temperature for the duration of the polymerisation. Pressure drop occurred after only 6½ hours and when the pressure had fallen to 75 p.s.i. after 8½ hours, the residual pressure was released. A very low solids latex was obtained and a very high proportion of the latex polymer particles were below 0.1 micron in size. The wet weight of build-up in the autoclave was equivalent to about 65% of the monomer initially charged to the mixing vessel.

On repeating the polymerization in the presence of 0.5 part of n-octadecane the reaction time was unchanged, and after 8½ hours at 50° C. the pressure in the reaction vessel had dropped to 75 p.s.i.g. On venting this residual pressure to atmosphere the product was obtained as a 25.4% solids latex and the weight of wet build-up in the autoclave was equivalent to 2.5% by weight of the monomer initially charged. The latex particle size range was of the order 0.05–1.3 microns with very few particles below 0.1 micron.

EXAMPLE 10

155 parts of water, 1 part of sulphonated diesel oil and 0.5 part of a mixture of hydrocarbons in the form of a paraffin wax having a solidifying point of 61° C. were heated together in a mixing vessel to 85° C. with vigorous stirring, and the wax dispersion was then cooled to room temperature while still being stirred. Atmospheric oxygen was purged from the vessel using nitrogen and 0.05 part of di-iso-octyl peroxydicarbonate and 100 parts of vinyl chloride were added to the wax dispersion. The mixture was stirred for five minutes and then homogenized following the procedure described in Example 15 using first and second stage homogeniser pressures of 1500 and 500 p.s.i.

When the homogenisation was completed the monomer dispersion was polymerized at 50° C. After 9 hours, the residual pressure of 75 p.s.i. was vented and a 21% solids latex was obtained the particle size of which was essentially between 0.05 and 1.5 microns, with only a minor proportion of the particles below 0.1 micron. The weight of wet build-up in the autoclave was equivalent to 12% by weight of the monomer used.

EXAMPLE 11

The procedure described in Example 10 was repeated except that 0.5 part of a mixture of hydrocarbons in the form of a micro-crystalline wax (solidifying point 76° C.) was used. The reaction time to venting at 75 p.s.i.g. was 9½ hours and a 20.2% solids latex was obtained. The weight of wet build-up was equivalent to 19% of the monomer used.

EXAMPLE 12

175 parts of water, 100 parts of vinyl chloride, 1 part of sulphonated diesel oil and 0.2 part of lauroyl peroxide were added to a stainless steel vessel from which most of the atmospheric oxygen had been removed by evacuation and purging with nitrogen. The mixture was stirred for 15 minutes to give a coarse dispersion of the vinyl chloride in water. This mixture was passed once through a two-stage high-speed pump homogeniser, the pressure of the first stage being 3000 p.s.i. and of the second stage 2000 p.s.i. and the homogenised mixture was passed to a stirred evacuated reaction vessel.

The reaction vessel was heated to 50° C. with stirring and the temperature was maintained constant at 50° C. for the duration of the reaction. After 11 hours the pressure in the reaction vessel began to drop and after 13 hours it had fallen from 100 p.s.i. to 75 p.s.i. gauge pressure. The remaining pressure was then released.

The product was in the form of a polymer latex having a solids content of 29.8% and the polymer particles varied in size from 0.05 to 0.9 micron. The wet weight of polymer buildup on the walls and stirrer of the reaction vessel was equivalent to 5% of the weight of vinyl chloride monomer charged to the mixing vessel.

The procedure described above was repeated using 0.05 part of di-2-ethylhexyl peroxydicarbonate in place of the lauroyl peroxide. The pressure developed in the reaction vessel began to drop after only 6¼ hours, and after 7¾ hours when it had fallen to 75 p.s.i. gauge pressure, the remaining pressure was released. The latex obtained had a solids content of 13.3% and the weight of wet pebble and build-up in the reaction vessel was equivalent to 75% of the weight of monomer initially charged. The latex also contained an increased proportion of polymer particles below 0.1 micron.

In a third polymerisation, the previous procedure was repeated except that 0.5 part of a mixture of n-paraffins containing from 10 to 20 carbon atoms per molecule and having an average of 15 carbon atoms per molecule was added to the polymerisation medium before homogenisation. Pressure drop occurred after 7 hours and the pressure had fallen to 75 p.s.i.g. after 8¼ hours. The solids content of the latex was found to be 30.9% and the weight of wet build-up was reduced to only 6.2% of the weight of monomer charged.

EXAMPLE 13

A coarse dispersion was made of 137 parts of water, 100 parts of vinyl chloride monomer, 0.2 part of lauroyl peroxide and 1 part of sodium dodecyl benzene sulphonate. This coarse dispersion was homogenized by a single pass through a two-stage high-speed pump homogeniser using first and second stage pressures of 1500 and 500 p.s.i. and was then polymerised at 50° C. The reaction time was 11 hours to pressure drop and 13 hours to venting at 75 p.s.i.g. A latex having a polymer size of 0.1–1.2 microns and 32.3% solids content was obtained. The wet weight of build-up in the reaction vessel was equivalent to 5% by weight of the vinyl chloride initially charged.

On repeating the polymerisation with 0.035 part of di-3,5,5-trimethylhexyl peroxydicarbonate in place of the lauroyl peroxide, the reaction time to venting at 75 p.s.i.g. was 10 hours, but only a small yield of 20% solids latex was obtained and the weight of wet pebble and build-up in the reaction was equivalent to 150% of the initial vinyl chloride monomer charge used.

In a further polymerisation 0.5 part of a mixture essentially of $C_8$–$C_{10}$ n-paraffins with a trace of $C_7$ n-paraffin was charged initially to the mixing vessel along with the other components of the polymerisation recipe. The reaction time in this case was 9 hours to venting at 75 p.s.i.g. and a 30.5% solids latex was obtained. The weight of wet pebble and build-up in the autoclave was however only 13.5% of the weight of monomer charged. The particle size distribution was essentially 0.05–1.1 micron, the number of particles below 0.1 micron being slightly higher than when lauroyl peroxide was used as catalyst.

EXAMPLE 14

By way of comparison, the procedure described in Example 13 was repeated except that 0.5 part of a mixture consisting essentially of branched chain isomeric octanes was used. The reaction time to venting at 75 p.s.i.g. was 9 hours, heavy build-up occurred and the product was in the form of a coagulum. The percentage of particles below 0.1 micron in size was considerably higher than when using lauroyl peroxide as catalyst. Thus, by comparing this example with Example 13, it may be seen that for the hydrocarbon to be effective in our process it should have a chain of at least eight carbon atoms.

EXAMPLE 15

Using the procedure described in Example 13, 137 parts of water, 100 parts of vinyl chloride, 1 part of sodium dodecyl benzene suphonate and 0.035 part of a mixture of di-alkyl ($C_7$–$C_9$) peroxydicarbonates were homogenised and subsequently polymerised at 50° C. The reaction time was 9 hours to venting. A high proportion of the product was in the form of build-up and coagulum and only a small quantity of low solids latex was obtained.

In a further polymerisation the above procedure was repeated but in addition 1 part of dodecyl benzene was charged to the mixing vessel with the other polymerisation ingredients. This did not affect the reaction time but the product was in the form of a 34.5% solids latex and the build-up in the reaction vessel was equivalent to only 2.5% of the weight of vinyl chloride initially charged.

EXAMPLE 16

137 parts of water, 100 parts of vinyl chloride, 1 part of sodium dodecyl benzene sulphonate, 0.035 part of a mixture of dialkyl ($C_7$–$C_9$) peroxydicarbonate, and 0.5 part of eicosane were homogenised and polymerised at 50° C. by the process described in Example 13. The reaction time to venting at 75 p.s.i.g. pressure was 9 hours. A 31.7% solids latex was obtained as the product and the weight of wet build-up was equivalent to 5% by weight of the monomer used. The latex particle size range was 0.05–1.3 microns and very similar to that when using lauroyl peroxide as catalyst.

EXAMPLE 17

145 parts of water, 100 parts of vinyl chloride, 1 part of sodium lauryl sulphate and 0.2 part of lauroyl peroxide were homogenised using the procedure described in Example 12. The reaction time to vent at 75 p.s.i.g. using a polymerisation temperature of 50° C. was 12¾ hours. A latex was obtained, the solids content of which was 33.2% and the latex polymer particle size was essentially 0.05–1.1 microns. The wet weight of build-up was equivalent to 7.5% of the weight of vinyl chrolide used.

Repeating the above procedure but using 0.035 part of a mixed dialkyl ($C_7$–$C_9$) peroxydicarbonate as catalyst in place of the lauroyl peroxide the reaction time to venting was 9 hours but over 50% of the yield was in the form of build-up or coagulum.

A further polymerisation was carried out using 0.035 part of the peroxydicarbonate as catalyst in the presence of 2.5 parts of eicosane. The reaction time to venting of 9 hours was the same as in the absence of the eicosane, but the product in the presence of the eicosane was obtained as a 35.2% solids latex and the weight of build-up was equivalent to only 1% of the weight of vinyl chloride charged initially.

EXAMPLE 18

The procedure described in Example 17 was repeated except that in place of the eicosane, 0.5 part of a chlorinated paraffin wax was used; this was based on a paraffin wax of average chain length of 24 carbon atoms per molecule, chlorinated to 42% by weight of chlorine. The reaction time to venting was 9½ hours and a 34% solids latex was obtained. The weight of wet build-up was equivalent to 5% of the vinyl chloride used.

EXAMPLE 19

As described in Example 9, 155 parts of water, 100 parts of vinyl chloride, 1 part of sulphonated diesel oil, 0.05 part of di-iso-octyl peroxydicarbonate and 1 part of a chlorinated mixture of paraffins containing essentially 10 to 13 carbon atoms per molecule and 70% by weight of chlorine were homogenised and polymerised at 50° C. The reaction time to venting at 75 p.s.i.g. was 8 hours: a 22% solids latex was obtained and the latex particle size was essentially 0.05–0.9 micron, with only a minor portion below 0.1 micron. The weight of wet build-up was equivalent to 9% by weight of the monomer initially charged.

EXAMPLE 20

Example 19 was repeated using 0.5 part of a chlorinated mixture of paraffins containing essentially 12 to 16 carbon atoms per molecule and 50% by weight of chlorine. The reaction time to venting at 75 p.s.i.g. was 8½ hours and the product was in the form of a 22.9% solids latex. The weight of wet build-up was equivalent to 6% of the monomer initially charged.

EXAMPLE 21

137 parts of water, 100 parts of vinyl chloride, 1 part of sodium dodecyl benzene sulphonate, 0.05 part of di-isoamyl peroxydicarbonate were homogenised as described in Example 13 and then polymerised at 50° C. After six hours the polymerisation temperature became uncontrollable and the residual vinyl chloride was vented off. The wet weight of build-up in the autoclave was equivalent to 101% of the weight of vinyl chloride charged and the remainder of the product was a 4% solids latex; a high proportion of the latex particles were less than 0.1 micron in size.

A further polymerisation was carried out as above but 1 part of eicosane was added initially to the vessel in addition to the water, catalyst and emulsifier. The reaction time to venting at 75 p.s.i.g. was only 6½ hours and a 33.8% solids latex was obtained. The weight of wet build-up was equivalent to only 7.0% of the vinyl chloride initially charged and the particle size distribution was 0.05–1.1 microns with only a small proportion of particles below 0.1 micron.

EXAMPLE 22

A polymerisation was carried out as described in Example 21 except that 0.5 part of a mixture of n-paraffins containing 15 to 17 carbon atoms per molecule were used in place of eicosane. The reaction time to venting at 75 p.s.i.g. was 6½ hours and a 34.5% solids latex was obtained. The proportion of particles below 0.1 micron was similar to when using lauroyl peroxide as catalyst and the weight of wet build-up was equivalent to 8.7% of the monomer used.

EXAMPLE 23

137 parts of water, 100 parts of vinyl chloride, 1 part of sodium dodecyl benzene sulphonate and 0.05 part of di-isopropyl peroxydicarbonate were homogenised as described in Example 13 and subsequently polymerised at 50° C. After 5 hours the temperature control of the reaction vessel became erratic and it was necessary to vent off the remaining unpolymerised vinyl chloride. A high proportion of the product obtained was in the form of build-up and the remainder was as a very low solids latex, a high proportion of the latex particles being below 0.1 micron in size.

A further polymerisation was carried out as described above but in the presence of 0.5 part of a mixture of n-paraffins containing from 15 to 17 carbon atoms per molecule. The reaction time to pressure drop was 6½ hours and a 30% solids latex was obtained. The weight of wet build-up was undesirably high at 26% by weight of the monomer charged. The polymer particle size distribution was essentially 0.05–1.1 microns but the percentage of particles below 0.1 micron was higher than when lauroyl peroxide is used as the polymerisation catalyst. It is apparent from this example that the use of a dialkyl peroxydicarbonate with less than 5 carbon atoms in the alkyl group connected to the carbonate group together with one of our specified hydrocarbon additives in the process of our invention precludes the reduction of build-up to a satisfactory extent in the polymerisation.

EXAMPLE 24

The polymerisation as described in Example 16 was repeated except that only 0.05 part of eicosane was used. The reaction time to venting was 8½ hours and a latex of satisfactory solids content was obtained. The weight of wet build-up however, had risen to 10.5% by weight of the monomer initially charged.

EXAMPLE 25

Using the same procedure as described in Example 12, a coarse dispersion of 160 parts of water, 100 parts of vinyl chloride monomer, 0.2 part of di-3,5,5-trimethylhexanoyl peroxide and 1 part of dioctyl sodium sulphosuccinate was homogenised by a single pass through a two-stage high-speed pump homogeniser using a pressure of 3000 p.s.i. at the first stage and 500 p.s.i. at the second stage. The homogenised mixture was then polymerised at 50° C. Pressure in the reaction vessel started to fall after 10 hours, showing that polymerisation of the vinyl chloride monomer was nearing completion and after 11 hours the residual pressure of 75 p.s.i.g. was released. The product was in the form of a latex having a solids content of 32.0%, and a high proportion of the polymer particles were within the size range 0.1–1.5 microns. The weight of wet build-up in the reaction vessel was equivalent to 12.5% by weight of the vinyl chloride monomer initially charged to the reaction vessel.

The polymerisation was repeated using 0.05 part of di-iso-octyl peroxydicarbonate in place of the 0.2 part of di-3,5,5-trimethylhexanoyl peroxide. Pressure drop occurred after only 6¼ hours and the pressure had fallen to 75 p.s.i.g. after 7¼ hours. After releasing the residual pressure a latex of very low solids content was obtained and the wet weight of build-up in the autoclave was found to be equivalent to 70% of the monomer initially charged. A substantial proportion of the number of polymer particles in the latex were below 0.1 micron.

On repeating the polymerisation in the presence of 0.5 part of a liquid aromatic hydrocarbon mixture having a boiling range 266°–283° C. which was fractionated from the condensation product of benzene and propylene polymer containing 9–18 carbon atoms, pressure drop occurred after 6½ hours and the residual pressure after 7½ hours of 75 p.s.i.g. was released. A latex of solids content 31% was obtained and the latex particle size distribution was comparable to when using di-3,5,5-trimethylhexanoyl peroxide as catalyst. The weight of wet autoclave build-up was equivalent to 5% of the monomer used.

EXAMPLE 26

137 parts of water, 100 parts of vinyl chloride, 1 part of sodium dodecyl benzene sulphonate, 0.035 part of a mixture of dialkyl ($C_7$–$C_9$) peroxydicarbonates and 0.2 part of a paraffin oil having an average molecular weight of 260 and containing 51% of material of a non-cyclic nature, and 49% of cyclo paraffins were homogenised and polymerised as described in Example 12. After 8 hours at 50° C. the pressure in the polymerisation vessel had fallen to 75 p.s.i.g. and this was released to atmosphere. A latex of 32.6% solids content was obtained, the particle size of which was essentially the same as when lauroyl peroxide is used as catalyst. The wet weight of build-up was equivalent to 12% of the monomer initially charged to the mixing vessel.

EXAMPLE 27

175 parts of water, 100 parts of vinyl chloride, 1 part of a sulphonated diesel oil and 0.2 part of lauroyl peroxide were added to a stainless steel vessel from which most of the atmospheric oxygen had been removed by evacuation and purging with nitrogen. The mixture was stirred for fifteen minutes to give a coarse dispersion of the vinyl chloride in water. This mixture was then passed once through a two-stage high-speed pump homogeniser, the pressure of the first stage being 3000 p.s.i., and of the second stage 2000 p.s.i. and the homogenised mixture was passed to a stirred evacuated reaction vessel.

The reaction vessel was heated to 50° C. with stirring and the temperature was maintained constant at 50° C. for the duration of the reaction. After eleven hours the pressure in the reaction vessel began to drop and after 13 hours it had fallen from 100 to 75 p.s.i. gauge pressure. The remaining pressure was then released.

The product was in the form of a polymer latex having a solids content of 29.8% and the polymer particles varied in size from 0.1 to 0.9 micron. The wet weight of polymer build-up on the walls and stirrer of the reaction vessel was equivalent to 5% of the weight of the vinyl chloride monomer charged to the mixing vessel.

The procedure described above was repeated using 0.05 part of di-2-ethylhexyl peroxydicarbonate as catalyst in place of the 0.2 part of lauroyl peroxide. The pressure developed in the reaction vessel began to drop after only 6¼ hours, and after 7¾ hours, when it had fallen to 75 p.s.i. gauge pressure, the remaining pressure was released. The latex obtained had a solids content of 13.3% and the weight of wet pebble and build-up in the reaction vessel was equivalent to 75% of the weight of monomer initially charged. The latex also contained a substantial proportion of polymer particles below 0.1 micron.

In a third polymerisation, the previous procedure using the peroxydicarbonate catalyst was repeated except that 1 part of methyl laurate was added to the polymerisation medium before homogenisation. Pressure drop occurred after 7¼ hours and the pressure had fallen to 75 p.s.i.g. after 8¼ hours. The solids content of the latex obtained was 28.6% and the weight of wet build-up was reduced to only 7.5% of the weight of monomer used.

EXAMPLE 28

Using the procedure described in Example 27, 155 parts of water, 100 parts of vinyl chloride, 1 part of sulphonated diesel oil and 0.035 part of a mixture of di-alkyl ($C_7$–$C_9$) peroxydicarbonates were homogenised and subsequently polymerised at 50° C. The reaction time was 9 hours to venting. A high proportion of the produce was in the form of build-up and coagulum and only a small quantity of low solids latex was obtained.

In a further polymerisation the above procedure was repeated but in addition 1 part of ethyl palmitate was charged to the mixing vessel with the other polymerisation ingredients. The reaction time venting at 75 p.s.i.g. was 11¼ hours and on this occasion the product was in the form of a 29.6% solids latex and the weight of wet build-up was equivalent to only 5% by weight of the monomer used. The latex particle size range was essentially 0.05–0.83 micron and the proportion of particles below 0.1 micron was small, of the order of that obtained when lauroyl peroxide is used as the catalyst.

EXAMPLE 29

A coarse dispersion was made of 137 parts of water, 100 parts of vinyl chloride monomer, 0.2 part of lauroyl peroxide and 1 part of sodium dodecyl benzene sulphonate. This coarse dispersion was homogenised by a single pass through a two-stage high-speed pump homogeniser using first and second stage pressures of 1500 and 500 p.s.i. and was then polymerised at 50° C. The reaction time was 11 hours to pressure drop and 13 hours to venting at 75 p.s.i.g. A latex having a polymer particle size of 0.1–1.2 microns and 32.3% solids content was obtained. The wet weight of build-up in the reaction vessel was equivalent to 5% by weight of the vinyl chloride initially charged.

On repeating the polymerisation with 0.035 part of di-3,5,5-trimethylhexyl peroxydicarbonate in place of the lauroyl peroxide, the reaction time to venting at 75 p.s.i.g. was 10 hours, but only a small yield of 20% solids latex was obtained and the weight of wet pebble and build-up in the reaction vessel was equivalent to 150% of the initial vinyl chloride monomer charge used.

A further polymerisation was carried out as described above in the presence of 0.035 part of di-3,5,5-trimethylhexyl peroxydicarbonate as catalyst and with the addition of 0.2 part of undecyl laurate. The reaction time to venting was 9 hours, and the weight of wet build-up was reduced to the same level as when using lauroyl peroxide as catalyst (i.e. 5%). The solids content of the latex obtained was 35.4% and the latex particle size distribution of 0.05–1.48 microns was substantially the same as when lauroyl peroxide was used as catalyst.

EXAMPLE 30

A polymerisation was carried out as described in Example 29 but using only 0.1 part of undecyl laurate. The reaction time to venting was 9½ hours and the weight of wet build-up rose to 11% by weight of the monomer initially charged.

EXAMPLE 31

155 parts of water, 100 parts of vinyl chloride, 1 part of sodium dodecyl benzene sulphonate, 0.05 part of di-2-ethylhexyl peroxydicarbonate and 1 part of cetyl formate were added to a stainless steel reaction vessel from which most of the atmospheric oxygen had been removed by evacuation and purging with nitrogen. The mixture was stirred for five minutes to give a coarse dispersion of the vinyl chloride in water and at the end of this time the mixture was cycled through a two-stage high-speed pump homogeniser back into the reaction vessel. Recycling through the homogeniser was continued for 10 minutes, the rate of flow through the homogeniser being adequate to ensure that at the end of this time, essentially all of the monomer had been homogenised.

When homogenisation was completed the reaction vessel was heated to 50° C. and maintained at this temperature for the duration of the polymerisation. The pressure formed in the reaction vessel started decreasing after 6¼ hours and after 7¾ hours had fallen to 75 p.s.i.g. The residual pressure was then released. A latex of 23.5% solids was obtained and the wet weight of build-up was equivalent to 4% by weight of the monomer initially used. The latex particle size distribution was similar to that obtained when lauroyl peroxide is used as catalyst.

EXAMPLE 32

By way of comparison, the polymerisation described in Example 31 was repeated using 1 part of isodecyl formate in place of the cetyl formate. The reaction time to venting of 8 hours was similar to that previously obtained but the weight of wet build-up had increased to 25.6% of the monomer initially used and an increased proportion of the latex polymer particles were below 0.1 micron in size.

EXAMPLE 33

Again, by way of comparison, the process of Example 31 was repeated using 0.05 part of di-iso-octyl peroxydicarbonate as catalyst and 1 part of ethyl caprylate as the carboxyl compound. The reaction time was 9 hours to venting but the product was in the form of a semi-coagulated latex. Polymer particle size distribution was 0.05–0.5 micron with a substantial proportion below 0.1 micron in size: the weight of wet build-up was equivalent to 20.2% of the monomer used.

EXAMPLE 34

The process of Example 31 was repeated using 1 part of methyl heptadecyl ketone in place of the cetyl formate. The reaction time to venting was 9 hours and the latex produced had a solids content of 25.4%. The weight of wet build-up was equivalent to only 4.2% of the weight of vinyl chloride used.

EXAMPLE 35

Using the same procedure as described in Example 31, 155 parts of water, 100 parts of vinyl chloride, 1 part of sulphonated diesel oil and 0.05 part of di-iso-octyl peroxydicarbonate were homogenised using a two-stage high-speed pump homogeniser; the pressures at the first and second stages of the pump being 1500 and 500 p.s.i. respectively.

When homogenisation was completed the reaction vessel was heated to 50° C. and maintained at this temperature for the duration of the polymerisation. Pressure drop occurred after only 6½ hours and when the pressure had fallen below 75 p.s.i.g. after 8½ hours, the residual pressure was released. A very low solids latex was obtained and a high proportion of the latex polymer particles were below 0.1 micron in size. The wet weight of buildup in the autoclave was equivalent to about 65% of the weight of monomer initially charged to the mixing vessel.

The process was repeated with the addition of 1 part of di-n-octyl maleate and in this case the reaction time to venting at 75 p.s.i.g. was 9 hours, the weight of wet build-up was equivalent to only 12.5% of the weight of monomer initially used and the latex particle size distribution was 0.05–1.23 microns with only a minor portion below 0.1 micron in size.

EXAMPLE 36

175 parts of water, 100 parts of vinyl chloride, 1 part of sulphonated diesel oil and 0.035 part of di-isodecyl peroxydicarbonate were homogenised and polymerised as described in Example 31. The reaction time to pressure drop was only 10½ hours, but the product was in the form of a partially coagulated latex and the proportion of latex polymer particles below 0.1 micron in size was much higher than in the case when lauroyl peroxide is used as catalyst. The weight of wet build-up was equivalent to 35% of the monomer initially charged to the polymerisation vessel.

The polymerisation was repeated with the modification that 1 part of di-isodecyl phthalate was added to the mixture of other components prior to homogenisation. The reaction time to venting was 11 hours and a latex of 29.5% solids content in which the polymer particles were essentially all within the size range 0.05–0.72 micron was obtained. The weight of wet build-up was equivalent to only 8.7% of the weight of vinyl chloride initially charged.

EXAMPLE 37

By way of comparison, the polymerisation described in Example 36 was repeated except that di-2-ethyl hexyl phthalate was used in place of di-isodecyl phthalate. The reaction time to venting was 12 hours and a latex of solids content 23.8% was obtained. However, the weight of wet build-up was equivalent to 25% of the weight of monomer used.

I claim:

1. A process comprising dispersing vinyl chloride and 0 to 20% by weight of at least one other ethylenically unsaturated copolymerisable monomer in water together with a surfactant and at least 0.005% by weight of the polymerisable monomer of a catalyst comprising at least one organic peroxydicarbonate in which the organic groups attached to each carbonate group each contain at least 5 carbon atoms, homogenizing the resulting dispersion and polymerising the homogenized dispersion at an elevated temperature in the presence of at least 0.50%, based on the weght of polymerisable monomer, of long-chain material comprising at least one compound selected from the group consisting of:

(a) compounds having the structure ROR', where R is a monovalent hydrocarbon radical containing an aliphatic chain of at least eight carbon atoms directly linked to the oxygen atom and R' is selected from the group consisting of hydrogen and monovalent hydrocarbon radicals, (b) hydrocarbons having an aliphatic group containing a chain of at least eight carbon atoms, and their halogenated derivatives, (c) carbonyl compounds having the structure

ZA.CO.BZ' where Z is selected from the group consisting of hydrogen, alkyl groups and substituted alkyl groups, Z' is selected from the group consisting of alkyl and substituted alkyl groups, A and B are each selected from the group consisting of direct linkages and oxygen atoms (and B is an oxygen atom when A is an oxygen atom) and the sum of oxygen atoms and aliphatic carbon atoms in a single chain in the compound is at least 12, and (d) compounds having the structure

M.O.CO.L.CO.O.N where M and N are each monovalent hydrocarbon radicals and L is selected from the group consisting of a direct link and divalent organic radicals, and in which the sum of atoms in L forming a chain between the ester groups which it links plus the sum of carbon atoms in M in the longest straight chain connected to the carboxyl oxygen atom plus the sum of carbon atoms in N in the longest straight chain connected to the carboxyl oxygen atoms is at least 16.

2. A process according to claim 1 in which the long-chain material is selected from the group consisting of liquids which are miscible with vinyl chloride, solids which are soluble in vinyl chloride and solids which are readily dispersible in the polymerization medium.

3. A process according to claim 1 in which the long-chain material is free from branch chains.

4. A process according to claim 1 in which the long-chain material is free from unsaturation.

5. A process according to ciaim 1 in which the long-chain material is present in amounts of from 0.05 to 4% based on the weight of polymerizable monomers.

6. A process according to claim 1 in which the long-chain material comprises at least one alcohol having from 12 to 18 carbon atoms.

7. A process according to claim 1 in which the long-chain material comprises at least one alcohol selected from the group consisting of lauryl alcohol, myristyl alcohol, cetyl alcohol and stearyl alcohol.

8. A process according to claim 1 in which the long-chain material is selected from the group consisting of di-n-nonyl ethyl and dicetyl ether.

9. A process according to claim 1 in which the long-chain material comprises at least one compound selected from the group consisting of alkanes and alkyl-benzenes, each having at least 12 carbon atoms in an aliphatic chain.

10. A process according to claim 9 in which the long-chain material comprises at least one alkane having at least 15 carbon atoms.

11. A process according to claim 1 in which the long-chain material is selected from the group consisting of heptadecane, octadecane, eicosane, dodecyl benzene, a mixture of n-paraffins containing from 10 to 20 carbon atoms per molecule and an average of 15 carbon atoms per molecule, a mixture of paraffins containing from 15 to 17 carbon atoms per molecule and a liquid aromatic hydrocarbon mixture having a boiling range of 266° C. to 283° C. which has been fractionated from the condensation product of benzene and propylene polymer containing 9 to 18 carbon atoms.

12. A process according to claim 1 in which the long-chain material comprises at least one material selected from the group consisting of a chlorinated derivative of a paraffin wax having an average chain length of 24 carbon atoms per molecule, chlorinated to 42% by weight of chlorine, a chlorinated mixture of paraffins containing essentially 10 to 13 carbon atoms per molecule and 70% by weight of chlorine and a chlorinated mixture of paraffins containing essentially 12 to 16 carbon atoms per molecule and 50% by weight of chlorine.

13. A process according to claim 1 in which the long-chain material comprises at least one alkyl ester of a carboxylic acid.

14. A process according to claim 1 in which the long-chain material comprises at least one compound having the structure ZA.CO.BZ' where Z is selected from the group consisting of hydrogen, alkyl groups and substituted alkyl groups, Z' is selected from the group consisting of alkyl and substituted alkyl groups, A and B are each selected from the group consisting of direct linkages and oxygen atoms (and B is an oxygen atom when A is an oxygen atom) and the sum of oxygen atoms and aliphatic carbon atoms in a single chain in the compound is at least 12 and containing a chain of from 16 to 24 carbon atoms.

15. A process according to claim 1 in which the long-chain material comprises at least one compound selected from the group consisting of methyl laurate, ethyl palmitate, undecyl laurate, cetyl formate and methyl heptadecyl ketone.

16. A process according to claim 1 in which the long-chain material comprises at least one dialkyl ester of a dicarboxylic acid.

17. A process according to claim 16 wherein said dicarboxylic acids are selected from the group consisting of maleic and phthalic acids.

18. A process according to claim 16 in which the long-chain material comprises at least the one member of the group consisting of di-n-octyl maleate and diisodecyl phthalate.

19. A process according to claim 1 in which the catalyst comprises at least one dialkyl peroxydicarbonate in which the alkyl groups are the same and in which each alkyl group contains a chain of at least 4 carbon atoms.

20. A process according to claim 19 in which the catalyst comprises at least one dialkyl peroxy-dicarbonate in which the alkyl groups are the same and in which each alkyl group contains from 5 to 20 carbon atoms.

21. A process according to claim 19 in which the catalyst comprises at least one dialkyl peroxydicarbonate in which the alkyl groups are the same in which each alkyl group contains from 6 to 13 carbon atoms.

22. A process according to claim 19 in which the catalyst comprises at least one dialkyl peroxydicarbonate in which the alkyl groups are the same in which each alkyl group contains from 8 to 10 carbon atoms.

23. A process according to claim 19 in which the catalyst is selected from the group consisting of di-isoamyl peroxydicarbonate, di-2-ethyl hexyl peroxydicarbonate, di-isooctyl peroxydicarbonate, di-3,5,5-trimethylhexyl peroxydicarbonate, di-isodecyl peroxydicarbonate and a mixture of peroxydicarbonates derived from alcohols containing from 7 to 9 carbon atoms.

24. A process according to claim 1 in which the catalyst is present in an amount of from 0.005% to 0.5% based on the weight of polymerisable monomer.

25. A process according to claim 1 in which the catalyst is present in an amount of from 0.01% to 0.1% based on the weight of polymerisable monomer.

26. A process according to claim 1 which is carried out in the presence, as surface active agent, of from 0.3 to 2% of an emulsifier, based on the weight of polymerizable monomer.

27. A process according to claim 26 in which the surface active agent is an anionic emulsifier.

28. A process according to claim 1 which is carried out in the presence, as surface active agent, of from 1% to 5% of a dispersing agent, based on the weight of polymerizable monomer.

29. A process according to claim 1 in which the long-chain material is added to the dispersion before homogenization.

30. A process according to claim 1 in which the homogenization is effected in a high-speed two-stage pump.

31. A process according to claim 1 in which the polymerization is effected at a temperature of from 40° C. to 65° C.

32. A process comprising dispersing vinyl chloride and 0 to 20% of its weight of at least one other ethylenically unsaturated copolymerisable monomer in water together with a surfactant and at least 0.005% by weight of the polymerizable monomer of at least one organic peroxydicarbonate in which the organic groups attached to each carbonate group each contain at least five carbon atoms, homogenizing the resulting dispersion and polymerizing the homogenized dispersion at an elevated temperature in the presence of at least 0.50% based on the weight of polymerizable monomer of long-chain material comprising at least one compound having the structure ROR', where R is a monovalent hydrocarbon radical containing an aliphatic chain of at least eight carbon atoms directly linked to the oxygen atom and R' is selected from the group consisting of hydrogen and monovalent hydrocarbon radicals.

No references cited.

JOSEPH L. SCHOFER, *Primary Examiner.*

J. A. DONAHUE, *Assistant Examiner.*

UNITED STATES PATENT OFFICE
CERTIFICATE OF CORRECTION

Patent No. 3,324,097                                               June 6, 1967

Gordon Edmund Alfred Pears

It is hereby certified that error appears in the above numbered patent requiring correction and that the said Letters Patent should read as corrected below.

Column 2, line 55, for "20" read -- 16 --.

Signed and sealed this 15th day of October 1968.

(SEAL)
Attest:

Edward M. Fletcher, Jr.                                      EDWARD J. BRENNER
Attesting Officer                                            Commissioner of Patents